United States Patent Office 3,004,857
Patented Oct. 17, 1961

3,004,857
CORROSION-INHIBITIVE PIGMENT
David A. Merson, Mill Neck, and Edward J. Dunn, Jr., Port Washington, N.Y., assignors to National Lead Company, New York, N.Y., a corporation of New Jersey
No Drawing. Filed July 12, 1960, Ser. No. 42,201
5 Claims. (Cl. 106—292)

This invention relates to a novel corrosion-inhibitive zinc chromate pigment.

Zinc chromate has long been known as one of the best corrosion inhibitive pigments, being generally in a superior class along with such well known pigments as red lead and lead chromate. Extensive commercial utilization of zinc chromate is limited, however, by its relatively high material and manufacturing costs.

The principal object of this invention is to provide a pigment which will have the excellent corrosion inhibitive properties of zinc chromate and which can be produced economically. Another object is to provide improved methods for the production of a corrosion-inhibitive zinc chromate pigment as aforesaid. Other objects and advantages will become apparent from the following more complete description and claims.

Broadly, this invention contemplates a composite zinc-chromate-silica pigment consisting essentially of $ZnCrO_4$ and $SiO_2$ in physico-chemical combination, said $ZnCrO_4$ being present in amount from 20 to 80% by weight of said pigment.

This invention also contemplates a method for the production of a composite coated pigment which comprises the steps of forming a slurry of finely-divided silica and zinc oxide, deliquoring said slurry, calcining the solid portion of said slurry to form a calcined product, forming an aqueous slurry of said calcined product, adding thereto a chromate selected from the group of water-soluble chromates including chromium trioxide, deliquoring said slurry and drying the solid portion thereof.

The effect of the process as just recited is to form an intimate mixture of silica and zinc oxide, which on calcination is converted to a calcined product characterized by particles of silica covered with a zinc coating. The coating is in the form of zinc oxide substantially free of zinc silicate. The calcination may be carried out at any temperature between about 500 and 750° C., but is preferably carried out at about 600° C. Below 500° C., the calcination is insufficient to bring about a coalescence between the coating and the silica core, and the product is a simple mixture of silica and zinc oxide which, on further treatment, yields a simple mixture of silica and zinc chromate, instead of the novel pigment of this invention. Above 750° C., the calcination causes undue particle growth, resulting in a gritty, abrasive material of large particle size, poor tinting strength and hiding power, and generally poor pigment properties.

To introduce the chromate radical, the calcined zinc-coated silica product is again slurried in water, and a soluble chromate is added to the slurry, preferably by slow addition of a water solution of the chromate to the slurry. The chromate reacts with the zinc oxide coating on the silica particles, converting it to a coating of zinc chromate. The slurry is then deliquored and dried to produce a composite zinc chromate-silica pigment which, although consisting largely of relatively inexpensive silica, exhibits the surface properties and the characteristic corrosion-inhibitive properties of zinc chromate pigment.

The amount of chromate introduced is preferably at least sufficient to form tetrabasic zinc chromate, $ZnCrO_4 \cdot 4ZnO$, with the amount of zinc oxide present on the surfaces of the silica particles. If less than this amount is used, the zinc will remain partly in the form of zinc oxide and the optimum corrosion-inhibitive properties are not achieved. The amount of chromate may be as high as that required to form normal zinc chromate, $ZnCrO_4$. A small excess (say 10%) over the stoichiometric quantity to form the normal salt is sometimes desirable in order to speed up the conversion of the zinc oxide to zinc chromate. Large excesses may be used, but are economically undesirable, since any excess over the quantity needed to form $ZnCrO_4$ remains dissolved in the liquid phase of the slurry and must be either recovered therefrom or discarded.

The zinc chromate coating may vary somewhat in composition, depending on the proportions of reactants used. In some of the pigments of this invention, the zinc is present as zinc yellow, while in others it may be present as the highly basic pigmentary substance sometimes known as zinc tetroxy chromate. Other modifications of zinc chromate, as yet undetected, may also be present. The properties of pigments according to this invention will naturally vary somewhat, depending on the precise physical and chemical constitution of the zinc chromate coating. These differences are minor, however, for most practical purposes, and all of the pigments according to this invention are useful corrosion-inhibiting pigments.

As a source of the chromate ingredient, it is preferred to use chromic acid which is readily available, but other chromate materials such as ammonium dichromate or potassium dichromate for instance, may be employed. As a source of silica, precipitated silicic acid or fine native silica may be used. It has been found, for instance, that a quartzite which is readily obtainable in powder form is quite satisfactory when ground to sufficient fineness in a suitable mill such as a pebble mill for example.

The proportions of the $ZnCrO_4$ and $SiO_2$ present in the pigment of this invention may be varied over a considerable range. On a percentage basis, a satisfactory product is obtained when there is from 20 to 80% zinc chromate by weight. The preferred range to produce the best combination of pigment properties is from 40 to 60% of zinc chromate.

While the pigment product of this invention as hereinbefore described consists essentially of zinc chromate and silica, incidental impurities which may occur in the raw material or which may be picked up in the manufacturing may be present in minor amounts. These will generally not exceed a total of about 1% and will ordinarily be of a type not significantly affecting the desired properties of the pigment or the process by which it is produced.

In order to facilitate the conversion of the zinc oxide to zinc chromate, it has been found advantageous to incorporate a small amount of an alkali such as potassium hydroxide into the slurry of calcined silica and zinc oxide. Amounts of potassium hydroxide equivalent to between 0.5 to 1.5% $K_2O$, by weight of the zinc chromate formed, are generally sufficient.

At the completion of the reaction, the slurry of zinc chromate coated silica is deliquored and dried. The deliquoring operation may be any one of several standard methods such as filtering and drying or feeding the slurry directly to a continuous inclined rotary drier. The deliquored slurry is dried at a temperature of between about 100 and 225° C. for a period of hours depending on the thickness of the bed. The drying temperature is not important except that temperatures above 250° C. generally result in breakdown of the chromate to other compounds, with resulting changes in the color of the product.

In order that this invention may be more clearly understood, the following example illustrating the preparation of the zinc chromate-silica pigment of this invention is offered.

*Example*

Two liters of water, 780 grams of zinc oxide, 7.8 grams KOH, and 2000 gram of finely divided silica were placed in a 4 gallon ball-mill and milled over night, filtered and calcined at 600° C. for 2 hours. This product is placed in a vessel with a stirring device and reacted with the addition of 213 grams of chromic acid. The 213 grams of chromic acid anhydride were dissolved in one liter of water and while the slurry of zinc coated silica was maintained with constant agitation, the chromic acid solution was slowly and constantly added thereto over a period of 2 hours. At the end of this time, the slurry was filtered and dried in an electric oven in suitable dishes at a temperature of 110° C. for 6 hours. The product was found to possess a fine soft texture, was free of grittiness and was found on analysis to contain:

|  | Percent |
|---|---|
| Zinc chromate | 32 |
| Silica | 68 |

This product was disintegrated of its soft agglomerates in a swing hammer type mill.

The pigment product of the example was ground into an alkyd vehicle to form a paint. The paint was tested and was found to have corrosion-inhibitive properties comparing favorably with those of a similar paint made with a conventional pure zinc chromate corrosion-inhibitive pigment.

The combination of the constituents in the pigment product of this invention is physico-chemical, that is, in part physical and in part chemical. It is evident that chemical compounds are formed by reaction between the chromate and ZnO and also that the silica is physically combined with these reaction products. The silica particles are coated with zinc chromate to produce a surface anti-corrosion pigment effect, while the core, which is normally not active in inhibiting corrosion, is of silica rather than of expensive zinc chromate.

It will be generally appreciated from the above results that the novel composite zinc chromate-silica pigment product of this invention combines the excellent corrosion-resistant metal-protective pigment properties of zinc chromate pigments with economy occasioned by the extension with silica, thus offering an economical superior corrosion inhibitive pigment product.

This application is a continuation-in-part of application Serial No. 708,991, filed January 15, 1958, and now abandoned.

While this invention has been described and illustrated by the example shown, it is not intended to be strictly limited thereto and other modifications and variations may be employed within the scope of the following claims.

We claim:

1. A composite zinc chromate-silica pigment consisting essentially of zinc chromate and particles of silica, said zinc chromate being present as a coating on said particles of silica and in amount from 20 to 80 percent by weight of said pigment, said pigment further characterized by the substantial absence of zinc silicate.

2. A composite zinc chromate-silica pigment consisting essentially of zinc chromate and particles of silica, said zinc chromate being present as a coating on said particles of silica and in amount from 40 to 60 percent by weight of said pigment, said pigment further characterized by the substantial absence of zinc silicate.

3. A composite zinc chromate-silica pigment consisting essentially of silica particles coated with a coalesced coating of zinc chromate, said pigment being further characterized by the substantial absence of zinc silicate.

4. A method for the production of a composite coated pigment which comprises the steps of forming a slurry of finely-divided silica and zinc oxide, deliquoring said slurry, calcining the solid portion of said slurry at a temperature between 500° C. and 750° C., to form a calcined product, forming an aqueous slurry of said calcined product, adding thereto a chromate selected from the group consisting of water-soluble chromates including chromium trioxide, said chromate being present in amount at least theoretically sufficient to form tetrabasic zinc chromate, $ZnCrO_4 \cdot 4ZnO$, with said zinc oxide, said zinc oxide and said chromate being present in amount sufficient to form zinc chromate in amount between 20 and 80% by weight of the sum of said zinc chromate and said silica, deliquoring said slurry and drying the solid portion thereof.

5. A method for the production of a composite coated pigment which comprises the steps of forming an aqueous slurry of finely-divided silica and zinc oxide, deliquoring said slurry, calcining the solid portion of said slurry at a temperature between 500° C. and 750° C. to form a calcined product, forming an aqueous slurry of said calcined product, adding thereto a chromate selected from the group consisting of water-soluble chromates including chromium trioxide, said chromate being present in amount at least theoretically sufficient to form tetrabasic zinc chromate, $ZnCrO \cdot 4ZnO$, with said zinc oxide, said zinc oxide and said chromate being present in amount sufficient to form zinc chromate in amount between 20 and 80% by weight of the sum of said zinc chromate and said silica, and a water-soluble caustic in amount equivalent to between 0.5 and 1.5% $K_2O$, by weight of the zinc chromate formed.

References Cited in the file of this patent

UNITED STATES PATENTS

| 2,068,294 | Korinth et al. | Jan. 19, 1937 |
| 2,296,638 | Hanahan | Sept. 22, 1942 |
| 2,313,619 | Bruce | Mar. 9, 1943 |
| 2,668,122 | Pitrot | Feb. 2, 1954 |